United States Patent
Newlin (10) Patent No.: US 12,510,617 B2
(45) Date of Patent: Dec. 30, 2025

(54) CURRENT MEASUREMENT SYSTEM AND METHOD

(71) Applicant: NXP USA, Inc., Austin, TX (US)

(72) Inventor: Trevor Mark Newlin, Mesa, AZ (US)

(73) Assignee: NXP USA, Inc., Austin, TX (US)

(*) Notice: Subject to any disclaimer, the term of this patent is extended or adjusted under 35 U.S.C. 154(b) by 202 days.

(21) Appl. No.: 18/391,373

(22) Filed: Dec. 20, 2023

(65) Prior Publication Data
US 2025/0208247 A1   Jun. 26, 2025

(51) Int. Cl.
G01R 35/00 (2006.01)
G01R 19/25 (2006.01)

(52) U.S. Cl.
CPC ....... G01R 35/005 (2013.01); G01R 19/2509 (2013.01)

(58) Field of Classification Search
CPC .............. G01R 35/005; G01R 19/2509; G01R 19/0092; G01R 19/32; G01R 1/203
USPC ...................................... 324/130, 76.11, 500
See application file for complete search history.

(56) References Cited

U.S. PATENT DOCUMENTS

| | | | |
|---|---|---|---|
| 5,554,986 A | 9/1996 | Neidorff | |
| 10,132,907 B2 * | 11/2018 | Schramme | ............. G01R 1/203 |
| 2011/0298473 A1 | 12/2011 | Irmer et al. | |
| 2014/0191768 A1 | 7/2014 | Engl | |
| 2019/0237961 A1 * | 8/2019 | Jiao | ........................ G01R 31/52 |
| 2020/0182909 A1 | 6/2020 | Hetzler | |
| 2021/0270870 A1 | 9/2021 | Chen et al. | |
| 2024/0302472 A1 * | 9/2024 | Harrington | .......... G01R 31/389 |

FOREIGN PATENT DOCUMENTS

DE   102017203535 A1   9/2018

* cited by examiner

Primary Examiner — Giovanni Astacio-Oquendo
(74) Attorney, Agent, or Firm — Andrew C. Milhollin (57) ABSTRACT

A current measurement system and a corresponding method are described, where the current measurement system includes a resistor structure having a sense resistor and a calibration resistor where a single metal layer of the resistor structure includes the sense resistor and the calibration resistor, calibration circuitry configured to provide a calibration current through the calibration resistor, and sense amplifiers configured to measure respective voltages across each of the calibration resistor and the sense resistor.

20 Claims, 4 Drawing Sheets

CURRENT MEASUREMENT SYSTEM AND METHOD

TECHNICAL FIELD

Embodiments of the subject matter described herein relate generally to current measurement systems, including current measurement systems with current sense resistors.

BACKGROUND

Circuitry for measuring electrical current is used in a variety of applications. For example, automotive systems typical current measurement circuitry to measure electrical current in each leg of a three-phase motor. Measurements generated by the current measurement circuitry in an automotive system may be used to drive system responses such as speed and torque. As a result, precise, accurate, and stable current measurement circuitry is typically desirable in automotive applications. Such current measurement circuitry is commonly implemented using a current transducer, such as a Hall effect sensor, air-core sensor, or fluxgate sensor.

SUMMARY

A brief summary of various exemplary embodiments is presented below. Some simplifications and omissions may be made in the following summary, which is intended to highlight and introduce some aspects of the various exemplary embodiments, without limiting the scope. Detailed descriptions of an exemplary embodiment adequate to allow those of ordinary skill in the art to make and use these concepts will follow in later sections.

In an example embodiment, a current measurement system includes a resistor structure having a sense resistor and a calibration sensor included in a single metal layer of a resistor structure, calibration circuitry configured to provide a calibration current through the calibration resistor, and sense amplifiers configured to measure respective voltages across each of the calibration resistor and the sense resistor.

In one or more embodiments, the sense amplifiers include a first sense amplifier configured to generate a reference voltage based on the voltage across the calibration resistor, and a second sense amplifier configured to generate a current sense voltage based on the voltage across the sense resistor.

In one or more embodiments, the current measurement system further includes an analog-to-digital converter (ADC) configured to receive the reference voltage and the current sense voltage, and generate at least one digital signal based on the reference voltage and the current sense voltage.

In one or more embodiments, the at least one digital signal includes a binary representation of a quotient of the reference voltage divided by the current sense voltage.

In one or more embodiments, the current measurement system further includes isolation circuitry coupled to an output of the ADC, and a digital-to-analog converter (DAC) configured to receive the at least one digital signal from the ADC via the isolation circuitry and to convert the at least one digital signal to an output voltage. An electrical current through the sense resistor is determinable based on the output voltage.

In one or more embodiments, the current measurement system further includes sample-and-hold circuitry configured to periodically sample the reference voltage from the first sense amplifier and to provide the reference voltage, as most recently sampled, to the ADC.

In one or more embodiments, the calibration circuitry further includes a switch coupled between an output of the calibration circuitry and the calibration resistor. A state of the switch is controlled by a clock signal, and the clock signal determines a sampling rate of the sample-and-hold circuitry.

In one or more embodiments, the sense resistor includes first sets of resistive fingers coupled in parallel, and the calibration resistor includes second sets of resistive fingers coupled in series.

In one or more embodiments, the resistor structure is arranged such that each set of resistive fingers of the second sets of resistive fingers of the calibration resistor is disposed between adjacent sets of resistive fingers of the first sets of resistive fingers of the sense resistor.

In an example embodiment, a method includes providing, by calibration circuitry, a calibration current through a calibration resistor, generating, by a first sense amplifier, a reference voltage based on voltage across the calibration resistor, and generating, by a second sense amplifier, a current sense voltage based on a voltage across a sense resistor. The calibration resistor and the sense resistor are formed in a single metal layer of a resistor structure.

In one or more embodiments, the method further includes generating, by an analog-to-digital converter (ADC) at least one digital signal that includes a binary representation of a quotient of the reference voltage divided by the current sense voltage.

In one or more embodiments, the method further includes providing, by the ADC, the at least one digital signal to a digital-to-analog converter (DAC) via isolation circuitry, and generating, by the DAC, an analog output voltage based on the at least one digital signal. A current through the sense resistor is determinable based on the analog output voltage.

In one or more embodiments, the method further includes sampling, by sample-and-hold circuitry, the reference voltage periodically at a sampling rate determined by a clock signal, and providing, by the sample-and-hold circuitry, the reference voltage, as most recently sampled, to the ADC.

In one or more embodiments, the method further includes changing, by the calibration circuitry based on the clock signal, a state of a switch in the calibration circuitry through which the calibration current is provided.

In one or more embodiments, the method further includes the sense resistor includes first sets of resistive fingers coupled in parallel, and the calibration resistor includes second sets of resistive fingers coupled in series and the resistor structure is arranged such that each set of resistive fingers of the second sets of resistive fingers of the calibration resistor is disposed between adjacent sets of resistive fingers of the first sets of resistive fingers of the sense resistor.

In one or more embodiments, a current measurement system includes a first resistor to be arranged in-line with a current-carrying conductor, a second resistor coupled to the first resistor, where the first resistor and the second resistor are formed from a single metal layer, calibration circuitry configured to provide a calibration current through the second resistor, and sense amplifiers configured to measure respective voltages across the first resistor and the second resistor.

In one or more embodiments, the sense amplifiers include a first sense amplifier configured to generate a reference voltage based on the voltage across the second resistor, and a second sense amplifier configured to generate a current sense voltage based on the voltage across the first resistor.

In one or more embodiments, the current measurement system further includes an analog-to-digital converter (ADC) configured to receive the reference voltage and the current sense voltage, and generate at least one digital signal based on the reference voltage and the current sense voltage.

In one or more embodiments, the current measurement system further includes isolation circuitry coupled to an output of the ADC, and a digital-to-analog converter (DAC) configured to receive the at least one digital signal from the ADC via the isolation circuitry and to convert the at least one digital signal to an output voltage. An electrical current through the first resistor is determinable based on the output voltage.

In one or more embodiments, the current measurement system further includes sample-and-hold circuitry configured to periodically sample the reference voltage from the first sense amplifier and to provide the reference voltage, as most recently sampled, to the ADC, and a switch coupled between an output of the calibration circuitry and the second resistor. A state of the switch is controlled by a clock signal, and the clock signal determines a sampling rate of the sample-and-hold circuitry.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted for sake of brevity. Additionally, elements in the drawing figures are not necessarily drawn to scale. For example, the dimensions of some of the elements or regions in the figures may be exaggerated relative to other elements or regions to help improve understanding of embodiments described herein.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose. As used herein, the words "exemplary" and "example" mean "serving as an example, instance, or illustration." Any implementation described herein as exemplary or an example is not necessarily to be construed as preferred or advantageous over other implementations. In addition, certain terms may be used herein for reference only, and thus are not intended to be limiting.

Directional references such as "top," "bottom," "left," "right," "above," "below," and so forth, unless otherwise stated, are not intended to require any preferred orientation and are made with reference to the orientation of the corresponding figure or figures for purposes of illustration.

Various embodiments described herein relate to systems and methods for electrical current sensing. For example, a current measurement system may include a resistor structure that includes a first resistor (sometimes referred to herein as a "sense resistor" or "current sense resistor") with multiple parallel electrically resistive fingers for in-line current sensing and a second resistor (sometimes referred to herein as a "calibration resistor") with multiple sets of electrically resistive fingers coupled in series. The voltage across the calibration resistor and the voltage across the sense resistor may each be measured (e.g., by sense amplifiers), and the voltage across the calibration resistor may be used as a reference against which the voltage across the sense resistor may be compared when subsequently determining the magnitude of electrical current passing through the sense resistor.

The calibration resistor and the sense resistor may be formed from the same metal layer and on the same substrate, such that temperature and manufacturing variations (e.g., variations in critical dimension (CD), metal thickness, resistive finger dimensions, and/or the like) have the same or essential the same effect on the resistance of the calibration resistor and the resistance of the sense resistor. The calibration resistor and the sense resistor may also be formed in close proximity to one another. For example, portions of the calibration resistor may be interposed between portions of the sense resistor, such that the calibration resistor and the sense resistor are each exposed to similar temperature conditions. In this way, the voltage across the calibration resistor can be used as a reference for the voltage across the sense resistor (e.g., by a multiplying analog-to-digital converter (ADC)) without needing to account for such temperature and manufacturing variations.

In one or more embodiments, a first sense amplifier may be used to measure the voltage across the sense resistor of the current measurement system. Calibration circuitry of the current measurement system may supply a precision current (e.g., directly or by supplying a precision voltage) through the calibration resistor, and a second sense amplifier may be used to measure the voltage across the calibration resistor. A multiplying ADC may receive the output of the first sense amplifier and the output of the second sense amplifier. The output of the second sense amplifier may be used as a reference input to the multiplying ADC. The multiplying ADC may generate digital signals (e.g., a sequence of binary pulses or multiple parallel binary pulses, with each pulse representing a digital bit) representing the voltage output by the first sense amplifier, referenced against the voltage output by the second sense amplifier (e.g., which may be represented as the quotient of the voltage output by the second sense amplifier divided by the voltage output by the first sense amplifier). The digital signals output by the multiplying ADC may be provided through isolation circuitry to a digital-to-analog converter (DAC) and/or processing circuitry. Herein, a "multiplying ADC" refers to an ADC that, instead of requiring a fixed reference voltage, can receive a reference voltage that may be varied to achieve different gains. The processing circuitry may be configured to determine the magnitude of the electrical current passing through the sense resistor based on the value represented by the digital signals received from the multiplying ADC.

In one or more embodiments, the current measurement system may include sample-and-hold circuitry that is interposed between the output of the second sense amplifier and the reference input of the multiplying ADC, and the calibration circuitry may include a switch that selectively connects the precision current or voltage sourced from the calibration circuitry to the calibration resistor. The sample-and-hold circuitry may periodically sample the output of the second sense amplifier to update the measured value of the voltage across the calibration resistor, in accordance with a clock signal. The switch may be toggled between off and on states (connecting/disconnecting the output of the calibration circuitry to/from the calibration resistor, respectively) by the same clock signal that is used to trigger sampling by the sample-and-hold circuitry. In this way, power consumption of the current measurement system may be advantageously reduced compared to, for example, an otherwise equivalent system that constantly measures the voltage across the calibration resistor and constantly supplies a precision current through the calibration resistor.

Figure 1:
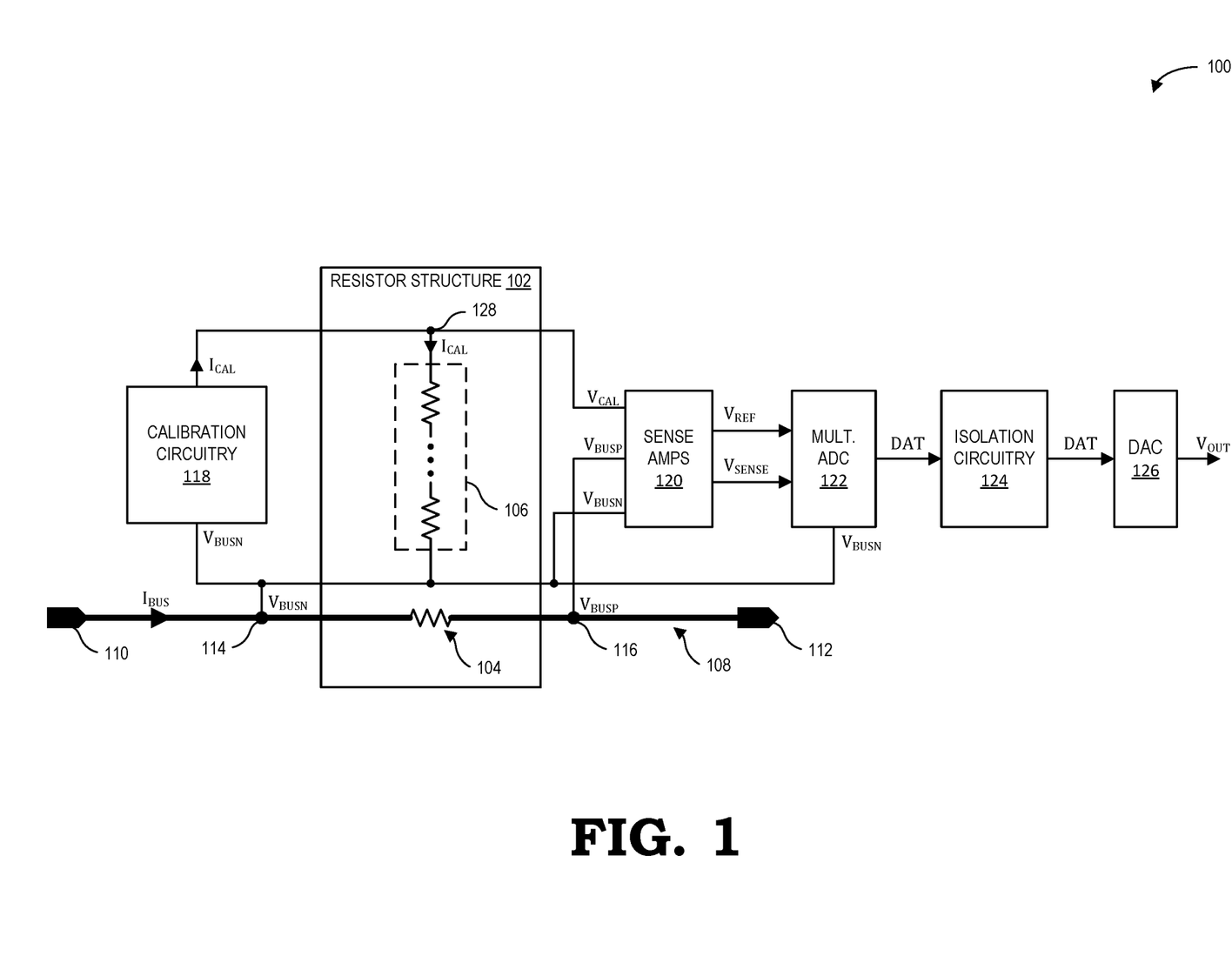
FIG. 1 is a block diagram illustrating an example current measurement system, in accordance with one or more embodiments.

FIG. 1 shows a block diagram of a current measurement system 100 that includes a resistor structure 102 that having a sense resistor 104 and a calibration resistor 106. It should be understood that herein, "current" refers electrical current and "resistance" refers to electrical resistance, unless otherwise indicated. The sense resistor 104 may be coupled in-line with a bus bar 108, where the current measurement system 100 is configured to measure the current $I_{BUS}$ through the bus bar 108 based, at least in part, on the voltage across the sense resistor 104. It should be understood that the current measurement system 100 is not limited to use with bus bars, and may instead be configured and arranged to measure current through any suitable current-carrying conductor.

The voltage across the sense resistor 104 may be determined as the difference between a voltage $V_{BUSN}$ and a voltage $V_{BUSP}$, where $V_{BUSN}$ is the voltage at a node 114 that is connected between a first terminal 110 of the bus bar 108 and a first terminal of the sense resistor 104, and $V_{BUSP}$ is the voltage at a node 116 that is connected between a second terminal 112 of the bus bar 108 and a second terminal of the sense resistor 104. The voltage across the calibration resistor 106 (e.g., $V_{CAL}-V_{BUSN}$) may be measured and used as a reference against which the measured voltage across the sense resistor 104 is compared for calibration purposes (e.g., scaling and temperature compensation) when determining the current $I_{BUS}$ through the bus bar 108. The sense resistor 104 and the calibration resistor 106 may be formed from the same metal layer on the same substrate and in close proximity to one another, such that the sense resistor 104 and the calibration resistor 106 each experience the same or substantially the same temperature variations and manufacturing variations. Because the temperature and manufacturing variations of the sense resistor 104 and the calibration resistor 106 are substantially the same, such variations do not need to be accounted for downstream, which advantageously reduces calibration complexity.

In addition to the resistor structure 102, the current measurement system 100 may include calibration circuitry 118 coupled to the calibration resistor 106, sense amplifiers 120 coupled to the sense resistor 104 and the calibration resistor 106, a multiplying ADC 122 coupled to the outputs of the sense amplifiers 120, a DAC 126, and isolation circuitry 124 coupled to the output of the multiplying ADC via the isolation circuitry 124.

To measure current through the bus bar 108, the sense amplifiers 120 of the current measurement system 100 may receive a first voltage $V_{BUSN}$ at the node 114 of the bus bar 108 (e.g., the voltage at the first terminal of the sense resistor 104), a second voltage $V_{BUSP}$ at the node 116 of the bus bar 108 (e.g., the voltage at the second terminal of the sense resistor 104), and a calibration voltage $V_{CAL}$ at a node 128. The node 128 may be coupled between a first terminal of the calibration resistor 106 and an output of the calibration circuitry 118 from which the calibration circuitry 118 provides the calibration current $I_{CAL}$. In one or more embodiments, the calibration circuitry 118 may include a precision voltage source or precision current source that is used to source the calibration current $I_{CAL}$. In one or more embodiments, a "precision voltage source" may be a voltage source that is sufficiently accurate such that an associated primary bandgap reference is the only appreciable source of error. In one or more embodiments, a "precision current source" may be a current source for which an associated calibrating resistor is the only appreciable source of error. The calibration circuitry 118 may supply the current $I_{CAL}$ in a pulsed mode or continuous mode, in accordance with various embodiments.

The sense amplifiers 120 may generate a reference voltage $V_{REF}$ based on an amplified (e.g., with a gain of between around 20 to around 40 as non-limiting examples) difference between the voltages $V_{CAL}$ and $V_{BUSN}$ (i.e., the voltage across the calibration resistor 106). The sense amplifiers 120 may generate a current sense voltage $V_{SENSE}$ based on an amplified (e.g., with a gain of around 20 to around 0 as non-limiting examples) difference between the voltages $V_{BUSP}$ and $V_{BUSN}$ (i.e., the voltage across the sense resistor 104). The voltage $V_{BUSN}$ at the node 114 may be used as a reference voltage (e.g., an analog ground reference voltage) for the calibration circuitry 118 and the multiplying ADC 122.

In one or more embodiments, the sense amplifiers 120 may include at least two auto-zero amplifiers. In one or more embodiments, the sense amplifiers 120 may each be configured to provide the same or substantially the same amount of gain.

The multiplying ADC 122 may receive the reference voltage $V_{REF}$ and the current sense voltage $V_{SENSE}$ from the sense amplifiers 120. The multiplying ADC 122 generate one or more data signals DAT based on the reference voltage $V_{REF}$ and the current sense voltage $V_{SENSE}$. The multiplying ADC 122 may provide the data signal(s) DAT to the DAC 126 via the isolation circuitry 124.

In one or more embodiments, the multiplying ADC 122 may transmit DAT as a sequence of pulses representing a binary number across a single serial communications link. In one or more embodiments, the multiplying ADC may transmit DAT as multiple parallel pulses representing a binary number across a parallel communications link. The binary number represented by DAT may be equal to the quotient of $V_{REF}$ divided by $V_{SENSE}$, in accordance with one or more embodiments. In one or more embodiments, the multiplying ADC 122 may include a multiplying DAC and one or more Successive Approximation Register (SAR) ADCs or Sigma Delta ADCs, as non-limiting examples.

The isolation circuitry 124 may provide electrical isolation between a high voltage domain of the bus bar 108 and a low voltage domain (i.e., lower than the high voltage domain) of the DAC 126 and circuitry at the output of the DAC 126. In one or more embodiments, such as automotive applications in which the bus bar 108 corresponds to the leg of a three-phase motor, the high voltage domain may include voltages of between 400 V and 800 V as a non-limiting example, and the isolation circuitry 124 may be a galvanically isolated communications link (GICL) in one or more such embodiments. In one or more other embodiments, such as when the bus bar 108 corresponds to the output of a 48 V battery, the high voltage domain may include voltages of between 20 V and 70 V as a non-limiting example, and the isolation circuitry 124 may include capacitive isolation circuitry in one or more such embodiments.

The DAC 126 may convert the data signal(s) DAT into an output voltage $V_{OUT}$. Processing circuitry (i.e., computer processing circuitry) may receive the output voltage $V_{OUT}$ from the DAC 126 (or, for example, a digital representation of $V_{OUT}$ via an ADC) and may be configured to generate a current value based on $V_{OUT}$, the current value representing the electrical current measured at the bus bar 108 using the sense resistor 104. In one or more embodiments, this current value may be stored in a computer-readable memory device coupled to the processing circuitry. While the DAC 126 is shown at the output of the isolation circuitry 124 in the present example, it should be understood that this is illustrative and non-limiting. For example, in one or more other embodiments, processing circuitry, such as that described above, may receive the data signal(s) DAT from the isolation circuitry 124 without an intervening DAC.

In one or more embodiments, the current measurement system 100 may be included in an automotive system. In one or more such embodiments, the bus bar 108 may be one leg of a three-phase motor, an output of a battery (e.g., a 48 V battery), or another suitable current path within the automotive system at which current measurement may be desired. In one or more such embodiments, the output of the DAC 126 may be provided to current limiting circuitry configured to compare the output voltage provided by the DAC 126 to a reference voltage and, upon determining that the output voltage exceeds the reference voltage, and to cause the current through the bus bar 108 to be reduced to a maximum current level or stopped (e.g., shutting down the source of current through the bus bar 108).

Because the calibration resistor 106 and the sense resistor 104 are formed as part of the same resistor structure 102 (e.g., as part of the same metal layer and in close proximity to one another), the calibration loop that includes the calibration resistor 106 and the calibration circuitry 118 dynamically scales (i.e., scaling $V_{CAL}$ and, as a result, $V_{REF}$) with changes in temperature that affect the sense resistor 104. This calibration loop also compensates for static sheet resistivity and critical dimension (CD) tolerances (each examples of manufacturing variability) for embodiments in which the calibration resistor 106 and the sense resistor 104 are formed from the same metal layer. Because the calibration resistor 106 compensates for temperature and manufacturing variabilities in this way, current sensing systems that include the resistor structure 102 may advantageously omit additional circuitry that would conventionally be required to accommodate for such temperature and manufacturing variabilities.

Figure 2:
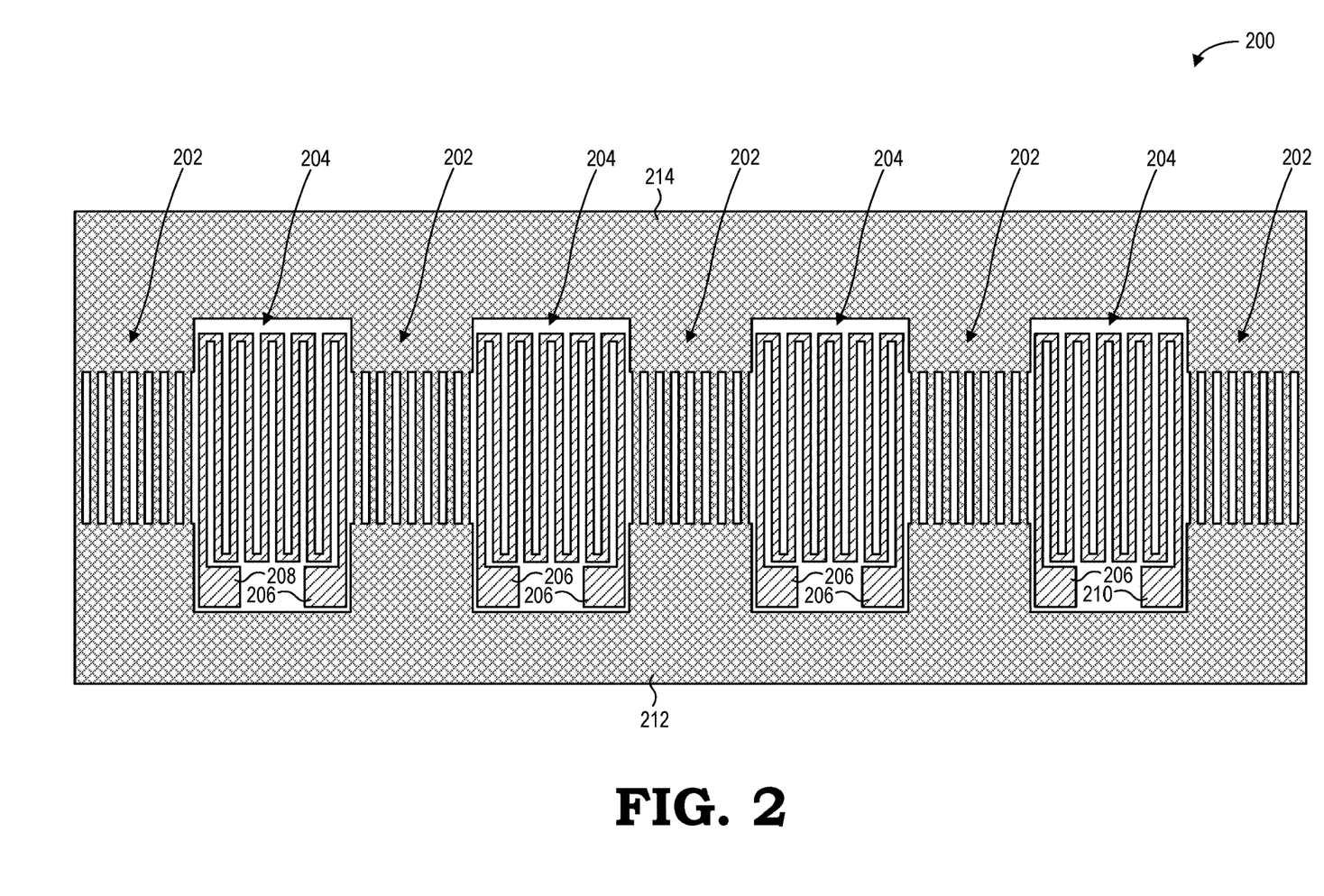
FIG. 2 is a top-down view illustrating an example resistor structure that may be used in a current measurement system, such as the current measurement system of claim 1, in accordance with one or more embodiments.

FIG. 2 shows a resistor structure 200, which may be an example embodiment of the resistor structure 102 of FIG. 1, as a non-limiting example. The resistor structure 200 includes first sets 202 of parallel resistive fingers that collectively form a first resistor (e.g., the sense resistor 104 of FIG. 1) and second sets 204 of resistive fingers, where each of the second sets 204 is interposed between a respective pair of adjacent sets of the first sets 202. Herein each strip of conductive material (e.g., metal) that extends between contacts 212 and 214 (though not necessarily touching the contacts 212 and 214 in the case of the second sets 204) is considered to be an individual "resistive finger." The second sets 204 may be coupled (e.g., connected) together in series to form a second resistor (e.g., the calibration resistor 106 of FIG. 1).

The resistive fingers of the first sets 202 may be coupled between a first contact 212 and a second contact 214, which may act as first and second terminals of the first resistor formed by the first sets 202. For example, the contact 212 may correspond to a first terminal (e.g., coupled to the node 114 of FIG. 1) of the first resistor and may be coupled to first and second sense amplifiers (e.g., first and second sense amplifiers of the sense amplifiers 120). For example, the contact 214 may correspond to a second terminal (e.g., coupled to the node 116 of FIG. 1) of the first resistor and may be coupled to the first sense amplifier (e.g., the first sense amplifier of the sense amplifiers 120).

In one or more embodiments, adjacent sets of the second sets 204 may be connected in series via wire bonds or interconnects connecting adjacent sets of the second sets 204 together at bond pads 206. Bond pads 208 and 210 of the second sets 204 may act as terminals of the second resistor formed by the second sets 204. For example, the bond pad 208 may correspond to a first terminal (e.g., coupled to the node 128 of FIG. 1) of the second resistor and may be coupled to calibration circuitry (e.g., the calibration circuitry 118 of FIG. 1) and the second sense amplifier (e.g., the second sense amplifier of the sense amplifiers 120 of FIG. 1). For example, the bond pad 210 may correspond to a second terminal (e.g., coupled to the node 114 of FIG. 1) of the second resistor and may be coupled to a bus bar (e.g., the bus bar 108 of FIG. 1) and to the first terminal of the first resistor.

In one or more embodiments, the first sets 202 may collectively include 40 resistive fingers coupled in series and the second sets 204 may collectively include 40 resistive fingers that are coupled in series when adjacent pairs of bond pads 206 are connected. Each of the resistive fingers of the sets 202 and 204 may have a width of around 25 µm. Each of the resistive fingers of the first sets 202 may have a resistance of around 2.5 mΩ, as a non-limiting example.

Each of the resistive fingers of the second sets 204 may have a resistance of around 2 mΩ. Given 40 2.5 mΩ parallel-connected resistive fingers in the first resistor and 40 2 mΩ series-connected resistive fingers in the second resistor, the first resistor may have a resistance of 100 μΩ and the second resistor may have a resistance of 80 mΩ. Herein, an amount that is said to be "around" or "approximately" a given value is considered to be within +/−10% of the given value unless otherwise indicated.

The resistive fingers of the first sets 202 and the second sets 204 may each be formed from the same metal layer. In one or more embodiments, the resistive fingers of the first sets 202 and the second sets 204 may be formed simultaneously via deposition of the metal layer followed by a photolithographic etch process or lift-off process as non-limiting examples. The metal layer from which the resistive fingers of the first sets 202 and the second sets 204 are formed may be copper, as a nonlimiting example.

By forming the first sets 202 and the second sets 204 from the same metal layer and interspersing the second sets 204 between adjacent sets of the first sets 202, the resistive fingers of the first sets 202 and the second sets 204 may be exposed to the same or approximately the same temperature conditions, such that resistance variability due to variation in temperature may affect the resistive fingers of the first sets 202 and the second sets 204 the same or similarly. Additionally, by forming the resistive fingers of the first sets 202 and the second sets 204 using the same deposition and etch process steps, the resistive fingers of the first sets 202 and the second sets 204 may be expected to have the same or similar dimensions (e.g., width, critical dimension (CD), thickness, and/or the like), such that manufacturing or fabrication process variability affects the resistive fingers of the first sets 202 and the second sets 204 the same or similarly. In this way, when the resistor structure 200 is implemented in, for example, a current measurement system (e.g., the current measurement system 100 of FIG. 1), the voltage measured across the second resistor may be used as a basis against which the voltage measured across the first resistor may be calibrated, since the respective resistances of the first and second resistors may be affected the same or similarly by temperature variability and manufacturing non-idealities.

Figure 3:
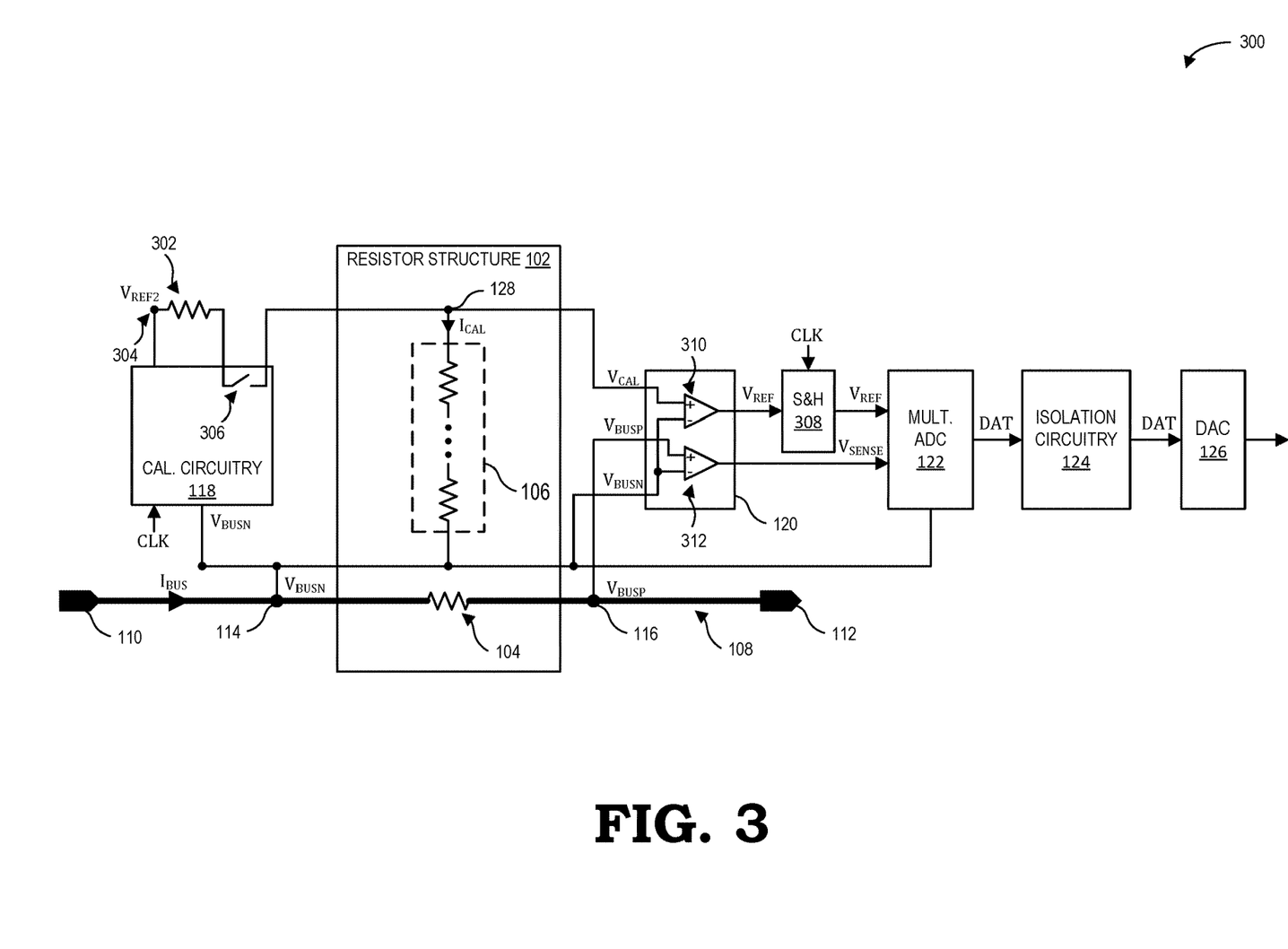
FIG. 3 is a block diagram illustrating an example current measurement system, in accordance with one or more embodiments.

FIG. 3 shows a block diagram of a current measurement system 300, which may correspond to an example embodiment of the current measurement system 100 of FIG. 1. One or more aspects of the current measurement system 300 may be similar to those of the current measurement system of FIG. 1, with like numerals being used here to denote like elements. Descriptions of such aspects or elements that are already described above are not necessarily repeated here for sake of brevity.

Because temperature variations are not expected to occur rapidly in certain applications, the power consumption of the calibration loop of the current measurement system 300 may be advantageously reduced by sampling the voltage across the calibration resistor 106 periodically, rather than continuously. In the present example, this may be achieved using sample-and-hold circuitry 308 to periodically sample $V_{REF}$, while preventing current from flowing through the calibration resistor 106 during time periods in which sampling of $V_{REF}$ does not occur.

As shown, the calibration circuitry 118 may include an output that is coupled to a node 304. The calibration circuitry 118 may be configured to supply a precision voltage $V_{REF2}$. Since the voltage at the node 304. The node 304 may be coupled to the node 128 via a resistor 302 and a switch 306 that is included in the calibration circuitry 118. The resistor 302 may be a precision resistor (e.g., having a tolerance of +/−1%), which may be an external resistor (i.e., not affected by the same temperature conditions as the calibration resistor 106) and/or a trimmed resistor (e.g., trimmed on silicon). In one or more embodiments, the resistor 302 may have a resistance equal to or approximately equal to 40Ω, (e.g., +/−1%) as a non-limiting example.

The calibration circuitry 118 may receive a clock signal CLK that controls the state of the switch, causing the switch 306 to toggle between an "off" (high impedance) state and an "on" (low impedance) state. When the switch 306 is in the on state, the calibration current $I_{CAL}$ current is allowed to pass from the output of the calibration circuitry 118 and through the resistor 302, the switch 306, and the calibration resistor 106. When the switch 306 is in the off state, no current passes from the calibration circuitry 118 through the calibration resistor 106.

As shown, the sample and hold circuitry 308 may be coupled between the reference voltage output (i.e., the output at which $V_{REF}$ is provided) of the sense amplifiers 120 and the corresponding input of the multiplying ADC 122. The sample-and-hold circuitry 308 may receive a clock signal CLK, which may be the same clock signal used to toggle the switch 306 of the calibration circuitry 118. The sample-and-hold circuitry 308 may be configured to sample a new value of $V_{REF}$ at each rising or falling edge of the clock signal CLK, depending on the configuration. That is, the clock signal CLK may determine the sampling rate of the sample-and-hold circuitry 308. The sample-and-hold circuitry 308 may store the most recently sampled value of $V_{REF}$ and may provide that value as an output to the multiplying ADC 122.

The sense amplifiers 120 may include a first sense amplifier 310 and a second sense amplifier 312 configured to measure the voltages across the calibration resistor 106 and the sense resistor 104, respectively. The first sense amplifier 310 may be configured to generate the reference voltage $V_{REF}$ as the difference between $V_{CAL}$ and $V_{BUSN}$, multiplied by the gain of the first sense amplifier 310. The second sense amplifier 312 may be configured to generate the current sense voltage $V_{SENSE}$ as the difference between $V_{BUSP}$ and $V_{BUSN}$, multiplied by the gain of the second sense amplifier 312.

In one or more embodiments, the first sense amplifier 310 and the second sense amplifier 312 may each be auto-zero amplifiers. In one or more embodiments, the first sense amplifier 310 and the second sense amplifier 312 may each provide the same or approximately the same gain to their respective outputs. For example, both the first sense amplifier 310 and the second sense amplifier 312 may be respectively configured to provide a gain of around 20 to around 40 to their respective output signals.

For example, given a voltage across the calibration resistor 106 of $V_{CAL}-V_{BUSN}=10$ mV, the first sense amplifier 310 may provide a gain of 40 to produce the reference voltage $V_{REF}$ at 400 mV. As another example, given a voltage across the sense resistor 104 of $V_{BUSP}-V_{BUSN}=1$ mV, the second amplifier may provide a gain of 40 to produce the current sense voltage $V_{SENSE}$ at 40 mV. Generally, the values of $V_{REF2}$ and the respective resistances of the resistor 302 and the calibration resistor 106 may be selected (in view of the respective gains of the sense amplifiers 310 and 312) such that the expected value of $V_{REF}$ is as high or higher than an expected ceiling voltage of $V_{SENSE}$, as the multiplying ADC 122 may require that $V_{SENSE}$ is less than $V_{REF}$.

In the present example, periodically sampling $V_{REF}$ with the sample-and-hold circuitry 308 while stopping supply of $I_{CAL}$ from the calibration circuitry 118 outside of the sampling period may advantageously decrease power consumption of the calibration loop compared to a continuous sampling approach. In various embodiments, the power consumption of the calibration loop may be reduced by around two orders of magnitude or more, depending on the configuration of the current measurement system 300, when compared to a continuous sampling approach, as a non-limiting example.

Figure 4:
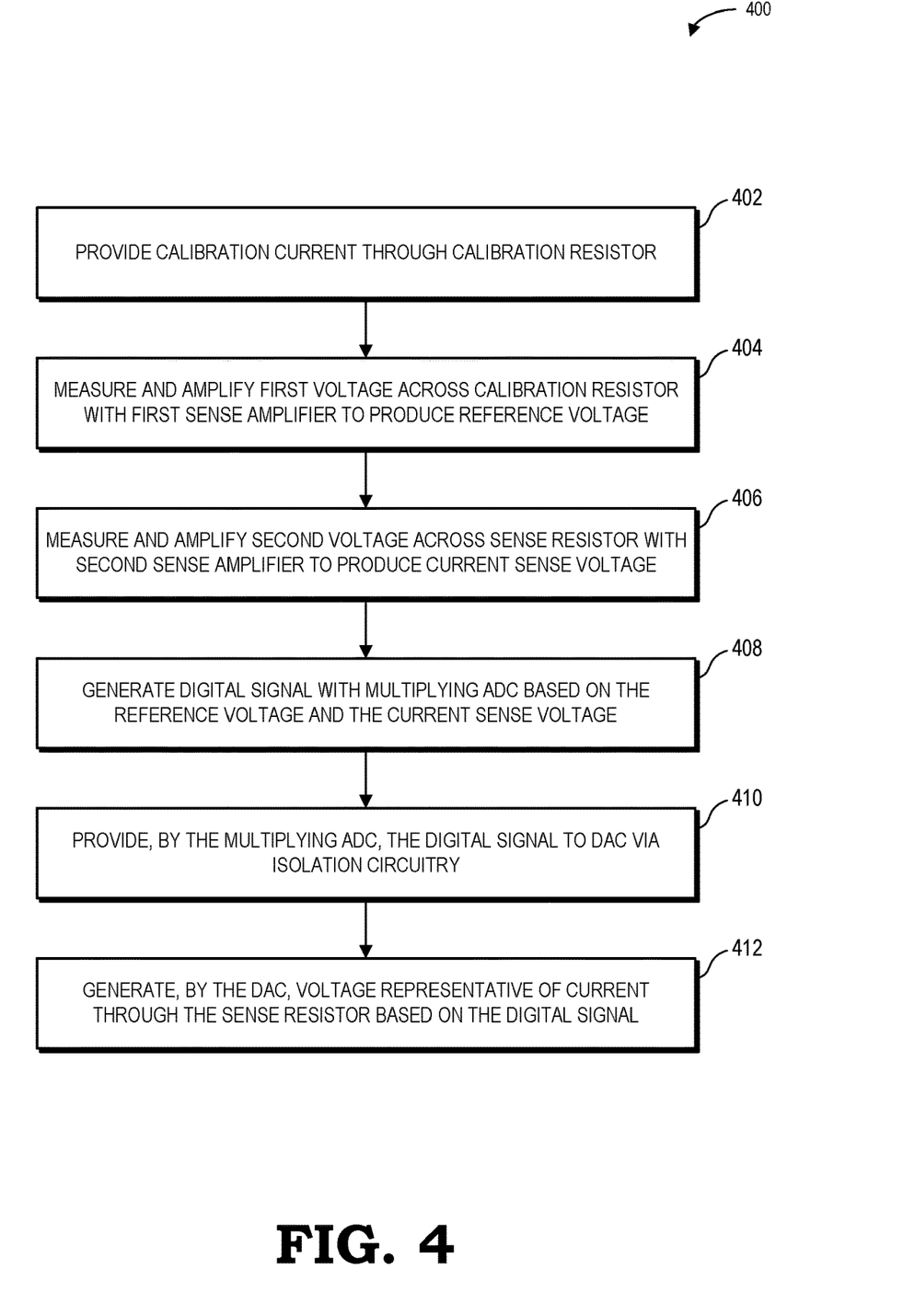
FIG. 4 is a process flow chart describing a method of measuring current using a current measurement system, such as the current measurement systems of FIG. 1 or 3, in accordance with one or more embodiments.

FIG. 4 shows an illustrative process flow for a method 400 by a current measurement system, such as the current measurement system 100 of FIG. 1 or the current measurement system 300 of FIG. 3, may generate calibrated current measurement data for a given bus bar or other current-carrying conductor. The method 400 is described with reference to elements of the current measurement system 100 of FIG. 1. However, it should be understood that this is illustrative and not limiting, at least in that other suitable current measurement systems may be used to carry out the method 400 in one or more other embodiments.

At block 402, a calibration current is provided through a calibration resistor. For example, the calibration circuitry 118 may provide the calibration current $I_{CAL}$ through the calibration resistor 106.

At block 404, a first voltage across the calibration resistor is measured and amplified using a first sense amplifier to generate a reference voltage. For example, a first sense amplifier (e.g., the first sense amplifier 310 of FIG. 3) of the sense amplifiers 120 may measure and amplify the difference between $V_{CAL}$ and $V_{BUSN}$ (i.e., the voltage across the calibration resistor 106) to generate the reference voltage $V_{REF}$.

At block 406, a second voltage across a sense resistor is measured and amplified using a second sense amplifier to generate a current sense voltage. The sense resistor may be coupled in-line with a current-carrying conductor (e.g., bus bar) through which current is to be measured by the current measurement system. For example, a second sense amplifier (e.g., the second sense amplifier 312 of FIG. 3) of the sense amplifiers 120 may measure and amplify the difference between $V_{BUSP}$ and $V_{BUSN}$ (i.e., the voltage across the sense resistor 104) to generate the current sense voltage $V_{SENSE}$. In one or more embodiments, block 404 and block 406 may be performed concurrently.

At block 408, a multiplying ADC generates one or more digital signals based on the reference voltage and the current sense voltage. For example, the multiplying ADC 122 may receive the reference voltage $V_{REF}$ and the current sense voltage $V_{SENSE}$ and may then generate the digital signal(s) DAT corresponding to a binary representation of the quotient $V_{REF}/V_{SENSE}$. The current through the sense resistor 104 may be determinable based on the digital signal(s) DAT.

At block 410, the multiplying ADC provides the digital signal(s) to a DAC via isolation circuitry. For example, the multiplying ADC 122 may provide the digital signal(s) DAT to the DAC 126 via the isolation circuitry 124.

At block 412, the DAC may generate a voltage that is representative of the current through the sense resistor based on the digital signal(s). For example, the DAC 126 may receive the digital signal(s) from the multiplying ADC 122 via the isolation circuitry 124 and may generate an analog output voltage $V_{OUT}$ equal to or approximately equal to $V_{REF}/V_{SENSE}$. Processing circuitry coupled to the output of the DAC 126 may receive $V_{OUT}$ or a digital representation thereof and may determine the current through the sense resistor 104 based on the magnitude of $V_{OUT}$, in view of known values of the nominal resistances of the sense resistor 104 and the calibration resistor 106, the gain of each of the sense amplifiers 120 and the calibration current $I_{CAL}$.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in one or more embodiments of the depicted subject matter.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments described herein may be implemented entirely in hardware or in an implementation containing both hardware and software elements. In embodiments which use software, the software may include but is not limited to firmware, resident software, microcode, etc.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A current measurement system comprising:
  a resistor structure comprising:
    a sense resistor; and
    a calibration resistor, wherein a single metal layer of the resistor structure includes the sense resistor and the calibration resistor;

calibration circuitry configured to provide a calibration current through the calibration resistor; and sense amplifiers configured to measure respective voltages across each of the calibration resistor and the sense resistor.

2. The current measurement system of claim 1, wherein the sense amplifiers comprise:
a first sense amplifier configured to generate a reference voltage based on the voltage across the calibration resistor; and
a second sense amplifier configured to generate a current sense voltage based on the voltage across the sense resistor.

3. The current measurement system of claim 2, further comprising
an analog-to-digital converter (ADC) configured to:
receive the reference voltage and the current sense voltage; and
generate at least one digital signal based on the reference voltage and the current sense voltage.

4. The current measurement system of claim 3, wherein the at least one digital signal includes a binary representation of a quotient of the reference voltage divided by the current sense voltage.

5. The current measurement system of claim 3, further comprising:
isolation circuitry coupled to an output of the ADC; and
a digital-to-analog converter (DAC) configured to receive the at least one digital signal from the ADC via the isolation circuitry and to convert the at least one digital signal to an output voltage, wherein an electrical current through the sense resistor is determinable based on the output voltage.

6. The current measurement system of claim 3, further comprising:
sample-and-hold circuitry configured to periodically sample the reference voltage from the first sense amplifier and to provide the reference voltage, as most recently sampled, to the ADC.

7. The current measurement system of claim 6, wherein the calibration circuitry further comprises:
a switch coupled between an output of the calibration circuitry and the calibration resistor, wherein a state of the switch is controlled by a clock signal, and wherein the clock signal determines a sampling rate of the sample-and-hold circuitry.

8. The current measurement system of claim 1, wherein the sense resistor comprises first sets of resistive fingers coupled in parallel, and the calibration resistor comprises second sets of resistive fingers coupled in series.

9. The current measurement system of claim 8, wherein the resistor structure is arranged such that each set of resistive fingers of the second sets of resistive fingers of the calibration resistor is disposed between adjacent sets of resistive fingers of the first sets of resistive fingers of the sense resistor.

10. A method comprising:
providing, by calibration circuitry, a calibration current through a calibration resistor;
generating, by a first sense amplifier, a reference voltage based on voltage across the calibration resistor; and
generating, by a second sense amplifier, a current sense voltage based on a voltage across a sense resistor, wherein the calibration resistor and the sense resistor are formed in a single metal layer of a resistor structure.

11. The method of claim 10, further comprising:
generating, by an analog-to-digital converter (ADC) at least one digital signal that includes a binary representation of a quotient of the reference voltage divided by the current sense voltage.

12. The method of claim 11, further comprising:
providing, by the ADC, the at least one digital signal to a digital-to-analog converter (DAC) via isolation circuitry; and
generating, by the DAC, an analog output voltage based on the at least one digital signal, wherein a current through the sense resistor is determinable based on the analog output voltage.

13. The method of claim 11, further comprising:
sampling, by sample-and-hold circuitry, the reference voltage periodically at a sampling rate determined by a clock signal; and
providing, by the sample-and-hold circuitry, the reference voltage, as most recently sampled, to the ADC.

14. The method of claim 13, further comprising:
changing, by the calibration circuitry based on the clock signal, a state of a switch in the calibration circuitry through which the calibration current is provided.

15. The method of claim 10, wherein the sense resistor comprises first sets of resistive fingers coupled in parallel, and the calibration resistor comprises second sets of resistive fingers coupled in series and the resistor structure is arranged such that each set of resistive fingers of the second sets of resistive fingers of the calibration resistor is disposed between adjacent sets of resistive fingers of the first sets of resistive fingers of the sense resistor.

16. A current measurement system comprising:
a first resistor to be arranged in-line with a current-carrying conductor;
a second resistor coupled to the first resistor, wherein the first resistor and the second resistor are formed from a single metal layer;
calibration circuitry configured to provide a calibration current through the second resistor; and
sense amplifiers configured to measure respective voltages across the first resistor and the second resistor.

17. The current measurement system of claim 16, wherein the sense amplifiers comprise:
a first sense amplifier configured to generate a reference voltage based on the voltage across the second resistor; and
a second sense amplifier configured to generate a current sense voltage based on the voltage across the first resistor.

18. The current measurement system of claim 17, further comprising:
an analog-to-digital converter (ADC) configured to:
receive the reference voltage and the current sense voltage; and
generate at least one digital signal based on the reference voltage and the current sense voltage.

19. The current measurement system of claim 18, further comprising
isolation circuitry coupled to an output of the ADC; and
a digital-to-analog converter (DAC) configured to receive the at least one digital signal from the ADC via the isolation circuitry and to convert the at least one digital signal to an output voltage, wherein an electrical current through the first resistor is determinable based on the output voltage.

20. The current measurement system of claim 18, further comprising:
- sample-and-hold circuitry configured to periodically sample the reference voltage from the first sense amplifier and to provide the reference voltage, as most recently sampled, to the ADC; and
- a switch coupled between an output of the calibration circuitry and the second resistor, wherein a state of the switch is controlled by a clock signal, and wherein the clock signal determines a sampling rate of the sample-and-hold circuitry.

* * * * *